United States Patent Office 2,882,315
Patented Apr. 14, 1959

2,882,315
PRODUCTION OF ORGANIC PHOSPHONYL HALIDE

Herbert J. Passino, Englewood, N.J., assignor to The M. W. Kellogg Company, Jersey City, N.J., a corporation of Delaware No Drawing. Application May 10, 1956
Serial No. 584,410

20 Claims. (Cl. 260—543)

This invention relates to a method for the manufacture of an organic phosphonyl difluoride. In one aspect the invention relates to the production of alkyl and cycloalkyl phosphonyl difluorides. In another more particular aspect the invention relates to the production of methane phosphonyl difluoride.

This application is a continuation-in-part of my prior and copending application Serial No. 200,485, filed December 12, 1950, now abandoned.

Methane phosphonyl difluoride is a known gaseous compound and is an exceedingly important compound. Prior to the present invention this compound has been produced by devious and round about methods involving numerous chemical and mechanical steps. The following equations indicate the presently proposed stepwise method for producing methane phosphonyl difluoride:

(1)  $6CH_3OH + 2PCl_3 \longrightarrow 2(CH_3O)_2POH + 2CH_3Cl$ (2)
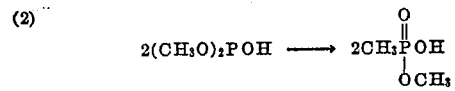

(3)
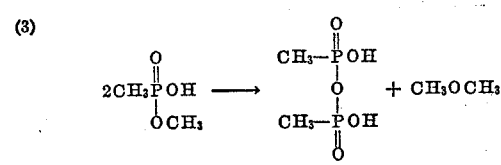

(4)
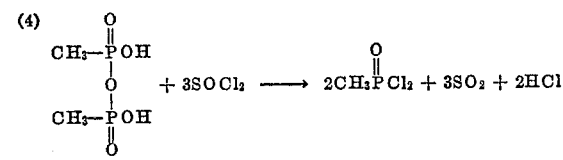

(5)
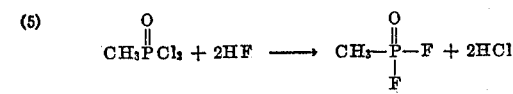

It is an object of this invention to provide a cheap and direct method for producing an organic phosphonyl difluoride.

Another object of this invention is to provide a method for producing methane phosphonyl difluoride in relatively high yields with high selectivity.

Still another object is to produce an organic phosphonyl halide with the minimum of by-products and with the maximum utilization of reactants.

Various other objects and advantages of the present invention will become apparent to those skilled in the art from the accompanying description and disclosure.

In accordance with this invention an organic phosphonyl halide having the general formula:

$$R-\overset{O}{\underset{\|}{P}}-X_2$$

where R is an organic radical, preferably an alkyl or cycloalkyl radical including the substituted radicals, such as an aralkyl radical or a halogen substituted alkyl or cycloalkyl radical, and X is a halogen atom of an atomic weight not greater than 80 and the X's may be the same or different halogen atoms, is produced by directly reacting a phosphorus halide, preferably the trihalide, at an elevated temperature with an organic compound of the formula: R—O—R' in which R is an organic radical and is the same as the R of the general formula for the organic phosphonyl halide, and R' is a radical containing an organic group. Mixtures of such organic compounds may be reacted with the phosphorus halide without departing from the scope of this invention.

Various phosphorus halides in which the halogen atoms are those having an atomic weight not greater than 80 may be employed. The phosphorus halides to be employed include phosphorous trifluoride, phosphorus trichloride, phosphorus tribromide, phosphorus pentafluoride, and the mixed phosphorus halides such as fluoro phosphorous dichloride, difluoro phosphorous chloride, fluorochloro phosphorous bromide, dichloro phosphorous bromide, difluoro phosphorus trichloride and difluoro phosphorous bromide. Of these phosphorus halides, the trivalent phosphorous halides are preferred. The particular phosphorus halide employed depends upon the ultimate product desired. When producing an organic phosphonyl difluoride, a difluoro phosphorus halide such as phosphorous trifluoride ($PF_3$) is preferred.

The organic compounds of the formula R—O—R' to be reacted with the phosphorus halide include the ethers, esters, acetals and ketals and are preferably those compounds in which R is an alkyl ar cycloalkyl radical having not more than eight carbon atoms and in which R' is an organic radical having not more than eight carbon atoms. The R radical has a continuous carbon skeleton, i.e. it is a radical in which the base carbon atoms are bonded directly to one another, the carbon atoms of the carbon skeleton being singly bonded to various monovalent groups such as hydrogen, halogen, nitro and cyano groups. R' may be of the same class and type of radicals as R, or R' may be of a different class of radicals. Thus, R' may also be a radical having a continuous carbon skeleton in which the carbon atoms are singly bonded to various monovalent groups such as hydrogen, halogen, nitro and cyano radicals. When R and R' are of the same class of radicals, R and R' may be the same radical as in the simple symmetrical ethers, or R and R' may be different radicals as in the simple unsymmetrical ethers. When R and R' are of the same class of radicals as in the simple ethers, a mixture of organic phosphonyl halides is usually obtained in which the groups corresponding to the R and R' groups of the starting material are bonded to phosphorous.

As indicated above, the definition of R' includes radicals which are of a different class than those defined for R. Thus, R' also may be an organic radical in which two of its base carbon atoms are separated by an atom of oxygen as in the polyethers, acetals and ketals and certain types of esters as the ortho esters. R' also may contain one or more carbon atoms which are doubly bonded to oxygen as in the monoesters and polyesters which contain a carbonyl group (C=O).

The preferred organic ethers are selected from the group consisting of the alkyl and cycloalkyl ethers including the substituted alkyl ethers such as aralkyl ethers. Examples of ethers are the simple symmetrical ethers such as dimethyl ether, diethyl ether, dipropyl ether, di-n-butyl ether, diisoamyl ether, dihexyl ether, dioctyl ether, dicyclohexyl ether, and dibenzyl ether. Such symmetrical ethers are the preferred type of ether reactant to be employed since they result in a maximum yield of the corresponding organic phosphonyl difluoride. Also to be employed are the unsymmetrical ethers, typical examples of which are: methyl ethyl ether, methyl n-butyl ether, ethyl n butyl ether, ethyl n-propyl ether, methyl t-butyl ether, and methyl benzyl ether. When an unsymmetrical ether is employed, mixed products corresponding to the different alkyl or cycloalkyl radicals of the ether are obtained and generally the alkyl group of shorter chain length attaches to the phosphorus to become an element of the main organic phosphonyl dihalide produced as a product of the process. Thus, when an unsymmetrical methyl ether such as methyl propyl ether is interacted with phosphorus trifluoride, for example, a mixture of products is obtained, one component of which is methane phosphonyl difluoride.

Various substituted ethers may also be employed, such as the halo, nitro and cyano substituted ethers, for example: beta,beta'-dichloro diethyl ether; chloromethyl ether; beta,beta'-oxy diproprionitrile; and 2-nitropropyl methyl ether. Instead of using simple ethers containing only one ether linkage, poly ethers, such as polyoxymethylene, polyoxyethylene and polyoxypropylene alcohols may be employed in this invention.

Examples of the esters include the mono esters, the poly esters and the ortho esters. Preferred mono esters are: methyl formate, methyl acetate, butyl acetate, phenyl acetate, benzyl acetate and methyl proprionate. Suitable ortho esters include trimethyl ortho formate, trimethyl ortho acetate and trimethyl ortho benzoate. Examples of polyesters are: dimethyl oxalate, dimethyl phthalate and dimethyl adipate. Other esters include the polyesters of inorganic acids, such as dimethyl sulfate, diethyl sulfate, trimethyl borate, tributyl borate and triethyl phosphate. Such esters can be formed by reacting an acid with an alcohol according to general esterification principles. When employing an ester as a reactant in accordance with this invention, the organic radical derived from the alcohol used to form the ester, preferentially becomes bonded to phosphorus and becomes an element of the main product of the reaction. For example, when a mono-ester having the formula

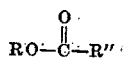

is reacted with PF₃ as described herein, the R group of the alcohol portion of the ester becomes attached to phosphorus to produce as a main product of reaction

wherein R in the ester reactant and the product are the same and are as above-defined. The carbonyl-containing portion

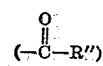

of such an ester represents the R' radical of the R—O—R' reactant and usually it is not found as an element in the main product of reaction.

Suitable acetals include dimethyl formal, diethyl formal, dimethyl acetal, and diethyl benzal. When an acetal having the formula

is employed as a reactant, the R"OCH₂— radical represents the R' radical of the R—O—R' reactant and the R group preferentially becomes bonded to phosphorus. Thus, for example, when dimethyl formal

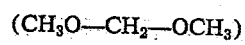

is interacted with phosphorus trifluoride as described herein, the main product of reaction is methane phosphonyl difluoride.

Examples of ketals for use in this invention are: dimethyl ketal of acetone and cyclohexanone. When such methyl ketals are employed, the main product of reaction is a methane phosphonyl dihalide, the reaction taking place in much the same manner as that described above for the esters and acetals.

A typical equation representing the reaction of this invention is shown below:

(6)

where R and R' are organic radicals as previously discussed.

The above reaction is carried out preferably at a temperature above about 100° C. and below the decomposition temperature of the reactants. Generally the temperature will be below about 400° C. The reaction is preferably carried out in the liquid phase and this is accomplished by employing sufficient pressure to maintain the reactants in liquid phase condition in the reaction zone at the temperature employed. The process is preferably carried out at an elevated pressure ranging from about 300 to about 3500 p.s.i. absolute or higher and is usually affected at a pressure between about 500 and 3,000 p.s.i. In order to obtain the desired elevated pressure, the reaction zone may be pressured with an inert gas such as nitrogen until the desired pressure is obtained. Conveniently, the reaction is carried out under autogenous conditions of pressure in a suitable closed reaction vessel such as a steel bomb. The preferred temperature range for liquid phase operations at elevated pressures is a temperature between about 200° and about 350° C.

Methane phosphonyl difluoride is produced by the following reaction under the above preferred reaction conditions:

(7)

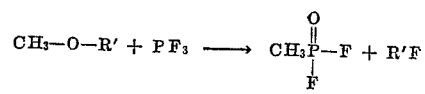

wherein CH₃—O—R' is used to represent a methyl ether, a methyl ester, a methyl acetal, and a methyl ketal and wherein the methyl group becomes bonded to phosphorus to form the main organic phosphonyl halide product of the process. The methane phosphonyl difluoride is separated from the reaction mixture by distillation.

The reaction may be carried out with or without the presence of catalysts, promoters or initiators. Catalysts which are beneficial in affecting the reaction are those of the Friedel-Crafts type, such as aluminum chloride, aluminum bromide, stannic chloride, zinc chloride, boron trifluoride and hydrogen fluoride. When a catalyst is employed, preferably it is employed in an amount from 0.01 mole to about 2 moles per mole of the difluoro phosphorus halide. The use of a Friedel-Crafts catalyst such as aluminum chloride leads to higher yields of desired product as compared to the yields obtained under the same reaction conditions when a catalyst is not employed. Another advantage derived from the use of such a catalyst is that it allows for the production of desired product at a temperature which is from about 10 degrees to about 25 degrees lower than the temperature required to obtain comparable yields of product in the absence of a catalyst.

The ratio of difluoro phosphorus halide and organic reactant may be varied over relatively wide limits but it is preferable to employ a slight excess of the organic reactant. Similarly, the time of reaction may vary over relatively wide limits, such as one minute to about 12 hours, with a reaction time of at least 0.5 hour being preferred.

The exact mechanism of the reaction is not known.

It is postulated, without limiting the invention, however, that the reaction mechanism may be written as follows:

(8) $\quad ROR' + PF_3 \longrightarrow RPOF_2 + R'F$ (9) $\quad R'F + PF_3 \longrightarrow RP\begin{subarray}{l}F\\F\\F\\F\end{subarray}$

(10) $\quad RP\begin{subarray}{l}F\\F\\F\\F\end{subarray} + ROR' \longrightarrow RPOF_2 + 2R'F$ In view of the above concept, it is, therefore, desirable to initiate the reaction with a small amount of an alkyl halide which acts as an initiator according to the above equations.

The organic fluoride (R'F) formed by the reaction may be utilized in the process by separately reacting the R'F with an alcohol (ROH) to produce the organic reactant ROR' and hydrogen fluoride. The organic reactant (ROR') is recovered from hydrogen fluoride by conventional methods for reuse, and the hydrogen fluoride may be used in making the difluoro phosphorus halide reactant. In the process of the present invention, the product organic phosphonyl difluoride is obtained in a single reaction step. The difluoro phosphorus halide may be obtained from hydrogen fluoride without resorting to the use of elementary fluorine. For example, the following equations show a convenient method of obtaining phosphorus trifluoride:

(11) $\quad ZnCl_2 + 2HF \rightarrow ZnF_2 + 2HCl$

(12) $\quad 2PBr_3 + 3ZnF_2 \rightarrow 2PF_3 + 3ZnBr_2$

The reaction may be carried out in continuous or batchwise systems without departing from the scope of this invention. The reaction may also be effected in the presence of liquid diluents in which the reactants are dissolved or are dispersed, for example, as an emulsion.

The products of reaction are separated and recovered by conventional techniques. The organic phosphonyl difluoride may be recovered directly from the reaction mixture or it may be hydrolyzed to the corresponding phosphonic acids which may be then converted to various ester derivatives, or the phosphonyl difluoride may be converted directly to a desired type ester or other derivatives by conventional methods and the derivatives recovered as the product of the process. The products are identified by the usual methods such as determination of boiling point and other such physical properties, determination of infra-red absorption analysis, percent composition analysis, and mass spectrometer analysis.

The following examples are offered as a better understanding of the present invention but the examples are not to be construed as unnecessarily limiting to the present invention.

*Example 1*

A 200 ml. steel pressure bomb is cooled in a Dry Ice acetone bath and is charged with 88 grams (1.0 mole) of phosphorous trifluoride and 46 grams (1.0 mole) of dimethyl ether. The bomb is then closed, placed in a reciprocating shaker and heated gradually to 250° C. and held at this temperature for 5 hours. The reaction is carried out under autogenous pressure, and under these reaction conditions it is estimated that the pressure obtained under equilibrium conditions is about 2800 p.s.i. absolute. After 5 hours of reaction, the bomb is cooled to about 0° C., and the pressure is released. The off-gas contains some unreacted dimethyl ether and appreciable amounts of methyl fluoride. The residual liquid is then transferred to a distillation flask and distilled at atmospheric pressure to obtain a substantial amount of methane phosphonyl difluoride. The reaction of this example is illustrated by the following equation:

(13) $\quad CH_3-O-CH_3 + PF_3 \longrightarrow CH_3-\overset{O}{\underset{\|}{P}}F_2 + CH_3F$

*Example 2*

Example 1 is repeated except that 1.33 grams (0.01 mole) of anhydrous aluminum chloride is added as a catalyst and the reaction is allowed to proceed under autogenous pressure and under the same conditions of time and temperature. The yield of methane phosphonyl difluoride thereby obtained is substantially higher than that obtained in Example 1.

*Example 3*

A 200 ml. steel pressure bomb is cooled to a temperature of about −80° C. and is charged with 89 grams (0.5 mole) of methyl acetate and 44 grams (0.5 mole) of phosphorous trifluoride. The bomb is then closed, placed in a reciprocating shaker and heated gradually to 275° C. and held at this temperature for 7 hours. After cooling to 0° C., the pressure is released and the reaction mixture is transferred to a distillation flask and distilled at atmospheric pressure. Methane phosphonyl difluoride is isolated as the main product of reaction by distillation.

By employing the procedures similar to those of Examples 1–3, methane phosphonyl difluoride also is obtained in substantial yield (i.e. in a yield of at least 5 percent) by interaction of phosphorus trifluoride with dimethyl sulfate, dimethyl acetal of acetone, and dimethyl acetal.

Although the above examples describe the preparation of methane phosphonyl difluoride, other organic difluorides may be prepared similarly by the process of this invention. Thus, for example, when dibutyl ether is reacted with phosphorous trifluoride at a temperature of about 275° C. at an elevated pressure of about 1500 p.s.i., butane phosphonyl difluoride is obtained in substantial yield and is recovered as a product of the process. Further when about equimolar amounts of phosphorous trifluoride and ethyl propionate are interacted at a temperature of about 250° C. at an elevated pressure of about 1,000 p.s.i. for a time of about 5 hours, ethane phosphonyl difluoride is produced in substantial yield and is recovered as a product of the process.

Although the invention has been described with relation to specific reaction conditions and operating techniques, various modifications and alterations may become apparent to those skilled in the art without departing from the scope of this invention.

Having described my invention I claim:

1. A process for the production of an organic phosphonyl difluoride which comprises reacting a difluoro phosphorus halide with an organic compound of the formula R—O—R' where R is a radical having not more than 8 carbon atoms selected from the group consisting of an alkyl and a cycloalkyl radical and R' is a radical having not more than 8 carbon atoms selected from the group consisting of an alkyl radical, a —CH$_2$—O-alkyl radical, a $$-\overset{O}{\underset{\|}{C}}\text{-alkyl}$$

radical, a $$-\overset{O}{\underset{\|}{C}}-H$$

radical, and an —SO$_2$O-alkyl radical, at a temperature between about 200° C. and about 400° C. to produce an organic phosphonyl difluoride of the formula $$R-\overset{O}{\underset{\|}{P}}-F_2$$

and recovering said organic phosphonyl difluoride as a product of the process.

2. The process of claim 1 in which said difluoro phosphorus halide is difluoro phosphorous bromide.

3. The process of claim 1 in which said difluoro phosphorus halide is difluoro phosphorous chloride.

4. The process of claim 1 in which said difluoro phosphorus halide is phosphorus pentafluoride.

5. The process of claim 1 in which said difluoro phosphorus halide is difluoro phosphorus trichloride.

6. A process for the production of an organic phosphonyl halide which comprises reacting a phosphorus trihalide containing two fluorine atoms with a compound of the formula R—O—R′ where R is an alkyl radical having not more than eight carbon atoms and R′ is a radical having not more than 8 carbon atoms selected from the group consisting of an alkyl radical, a —CH$_2$—O-alkyl radical, a

radical, a

radical, and an —SO$_2$O-alkyl radical, at a temperature between about 200° C. and about 400° C. to produce an organic phosphonyl difluoride of the formula

and recovering said organic phosphonyl difluoride as a product of the process.

7. The process of claim 6 in which the reaction is effected in the presence of a Friedel-Crafts type catalyst.

8. The process of claim 6 in which the reaction is effected in the absence of a catalyst.

9. A process for the production of an organic phosphonyl difluoride which comprises reacting a phosphorus trihalide containing two fluorine atoms and in which the other halogen atom has an atomic weight not greater than 80 with a compound of the formula R—O—R′ where R is an alkyl radical having not more than eight carbon atoms and R′ is a radical having not more than 8 carbon atoms selected from the group consisting of an alkyl radical, a —CH$_2$—O-alkyl radical, a

radical, a

radical, and an —SO$_2$O-alkyl radical, at a temperature between about 200° C. and about 350° C. under liquid phase conditions to produce an organic phosphonyl halide of the formula

and recovering the organic phosphonyl halide thus produced as a product of the process.

10. A process for the production of a methane phosphonyl difluoride which comprises reacting a difluoro phosphorus halide in which the halogen atoms are those having an atomic weight not greater than 80 with an ether of the formula —CH$_3$—O-alkyl wherein the alkyl group has not more than 8 carbon atoms at a temperature of between about 200° C. and about 400° C. to produce a methane phosphonyl difluoride having the formula

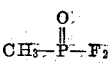

and recovering the methane phosphonyl difluoride thus produced as a product of the process.

11. A process for the production of an organic phosphonyl fluoride which comprises reacting a phosphorus trifluoride with an alkyl mono-ether in which each of the alkyl groups bonded to the ether oxygen has a continuous carbon skeleton of not more than eight carbon atoms, at a pressure between about 300 and about 3500 pounds per square inch and at a temperature of at least 200° C., to produce an organic phosphonyl fluoride in which the phosphorus is bonded to the carbon atom of an alkyl group having only a continuous carbon skeleton of not more than eight carbon atoms, and recovering said organic phosphonyl difluoride as a product of the process.

12. A process for the production of methane phosphonyl difluoride which comprises reacting a phosphorus fluoride with an organic compound of the formula CH$_3$—O—R′ where R′ is a radical having not more than 8 carbon atoms selected from the group consisting of an alkyl radical, a —CH$_2$—O-alkyl radical, a

radical, a

radical, and an —SO$_2$O-alkyl radical, at a temperature above 200° C. in the presence of a Friedel-Crafts catalyst to produce methane phosphonyl difluoride.

13. A process for the production of methane phosphonyl difluoride which comprises reacting a phosphorous trihalide containing two fluorine atoms and in which the other halogen atom has an atomic weight not greater than 80 with dimethyl ether at a temperature between about 200° C. and about 350° C. to produce methane phosphonyl difluoride, and recovering the methane phosphonyl difluoride thus produced as a product of the process.

14. A process for the production of methane phosphonyl difluoride which comprises reacting phosphorous trifluoride with dimethyl ether at a temperature between about 200° C. and about 350° C. under autogenous conditions such that methane phosphonyl difluoride is produced, and recovering the methane phosphonyl difluoride as a product of the process.

15. The process of claim 14 in which the reaction is effected in the presence of aluminum chloride as a catalyst.

16. A process for the production of methane phosphonyl difluoride which comprises reacting a difluoro phosphorus halide in which the halogen atoms are those having an atomic weight not greater than 80 with an ester of the formula therefor

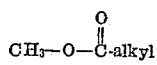

in which the alkyl radical has not more than eight carbon atoms at a temperature between about 200° C. and about 400° C. to produce methane phosphonyl difluoride.

17. A process for the production of methane phosphonyl difluoride which comprises reacting a difluoro phosphorus halide in which the halogen atoms are those having an atomic weight not greater than 80 with methyl acetate at a temperature between about 200° C. and about 350° C. to produce methane phosphonyl difluoride and recovering the methane phosphonyl difluoride thus produced as a product of the process.

18. A process for the production of methane phosphonyl difluoride which comprises reacting a difluoro phosphorus halide in which the halogen atoms are those having an atomic weight not greater than 80 with dimethyl sulfate at a temperature between about 200° C. and about 350° C. to produce methane phosphonyl difluoride, and recovering the methane phosphonyl difluoride thus produced as a product of the process.

19. A process for the production of methane phosphonyl difluoride which comprises reacting a difluoro phosphorus halide in which the halogen atoms are those having an atomic weight not greater than 80 with dimethoxy acetone at a temperature between about 200° C. and about 350° C. to produce methane phosphonyl difluoride, and recovering the methane phosphonyl difluoride thus produced as a product of the process.

20. A process for the production of methane phosphonyl difluoride which comprises reacting a difluoro phosphorus halide in which the halogen atoms are those having an atomic weight not greater than 80 with dimethyl acetal at a temperature between about 200° C. and about 350° C. to produce methane phosphonyl difluoride, and recovering the methane phosphonyl difluoride thus produced as a product of the process.

References Cited in the file of this patent

UNITED STATES PATENTS 2,500,022    Brown _____ Mar. 7, 1950